(12) United States Patent
Kim

(10) Patent No.: US 9,454,675 B2
(45) Date of Patent: Sep. 27, 2016

(54) APPARATUS AND METHOD FOR PROTECTING PERSONAL INFORMATION OF RECORDED IMAGE, AND COMPUTER-READABLE RECORDING MEDIUM HAVING COMPUTER PROGRAM RECORDED THEREIN

(71) Applicant: IDIS Co., Ltd., Daejeon (KR)

(72) Inventor: Chul Kim, Gyeonggi-do (KR)

(73) Assignee: IDIS Co., Ltd., Daejeon (KR)

( * ) Notice: Subject to any disclaimer, the term of this patent is extended or adjusted under 35 U.S.C. 154(b) by 40 days.

(21) Appl. No.: 14/605,885

(22) Filed: Jan. 26, 2015

(65) Prior Publication Data

US 2016/0217300 A1    Jul. 28, 2016

(51) Int. Cl.
*G06F 21/62* (2013.01)

(52) U.S. Cl.
CPC .................................. *G06F 21/6245* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,744,461 | B1 * | 6/2004 | Wada | H04N 7/18 348/143 |
| 7,116,477 | B2 * | 10/2006 | Nishihara | G02B 27/2214 348/54 |
| 9,113,130 | B2 * | 8/2015 | Sandrew | H04N 9/79 |
| 2008/0063378 | A1 * | 3/2008 | Togo | H04N 7/007 386/278 |
| 2012/0293610 | A1 * | 11/2012 | Doepke | H04N 5/23238 348/36 |
| 2013/0004090 | A1 * | 1/2013 | Kundu | G07F 19/207 382/232 |
| 2013/0108105 | A1 * | 5/2013 | Yoo | H04N 5/272 382/103 |

FOREIGN PATENT DOCUMENTS

JP          3838506 B      10/2006
KR   10-2012-0035299       4/2012

\* cited by examiner

*Primary Examiner* — Beemnet Dada
(74) *Attorney, Agent, or Firm* — Intellectual Property Law Group LLP

(57) ABSTRACT

Disclosed are an apparatus which is capable of easily performing the personal information protection processing without changing the original image recorded in the image recorder, a method thereof, and a computer-readable recording medium having computer program recorded therein. The method for protecting personal information of a recorded image includes: performing personal information protection processing by masking a personal information protection region that needs personal information protection based on a user input signal for an original image in a predetermined section of the recorded image designated by a user; generating metadata which represents a personal information protection processing result; and generating a personal information protection processed image file including a playing program which plays the original image, the original image file, and the metadata which represents the personal information protection processing result for the original image.

13 Claims, 6 Drawing Sheets

| ID | FRAME POSITION INFORMATION | TYPE INFORMATION | MASKING METHOD INFORMATION | METADATA SECURITY INFORMATION | MASKING ZONE INFORMATION | ~300 ... |
|---|---|---|---|---|---|---|

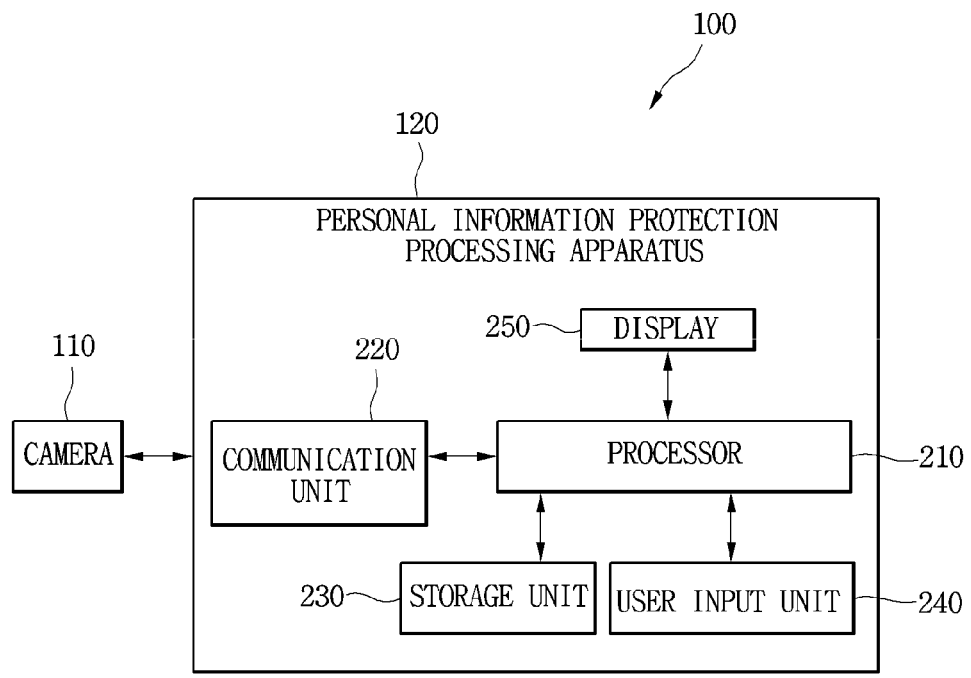

FIG. 3

| ID | FRAME POSITION INFORMATION | TYPE INFORMATION | MASKING METHOD INFORMATION | METADATA SECURITY INFORMATION | MASKING ZONE INFORMATION | —300 ... |

APPARATUS AND METHOD FOR PROTECTING PERSONAL INFORMATION OF RECORDED IMAGE, AND COMPUTER-READABLE RECORDING MEDIUM HAVING COMPUTER PROGRAM RECORDED THEREIN

BACKGROUND OF THE INVENTION

1. Technical Field

The present invention relates to an apparatus and method for processing a recorded image, and more specifically to an apparatus for protecting personal information on the recorded image, a method thereof, and a computer-readable recording medium having a computer program recorded therein.

2. Related Art

With the protection of personal information strengthened, restrictions should be placed on the output of items related to personal information such as the person, car number and exposure-prohibited region that are captured on a recorded image extracted from a security image recorder. For the protection of personal information related to such a security image, methods such as masking or opaque filtering on the region related to personal information are used in a playing of the recorded image and static image extraction processes.

However, in order for the recorded image extracted from the image recorder to be used as legal evidential material, an original image should be maintained. However, because the original image is changed during the image processing processes such as encoding, masking and decoding for the original image in the masking process for the protection of personal information, there is a problem that it becomes unsuitable as legal evidential material. In addition, since the original image should be maintained, there is a problem that it becomes impossible even for the authorized user to process the protection of personal information on the extracted recorded image. For example, Korean Patent Laid-Open Publication No. 10-2012-0035299, which is published on Apr. 16, 2012, discloses an image protection processing apparatus for personal information protection, and image security system and method using the same.

SUMMARY OF THE INVENTION

Accordingly, it is an object of the present invention to provide an apparatus for protecting personal information without changing the original image recorded in the image recorder, a method thereof, and a computer-readable recording medium having the computer program recorded therein.

A method for protecting personal information of a recorded image according to one aspect of the present invention, includes: performing personal information protection processing by masking a personal information protection region that needs personal information protection based on a user input signal for an original image in a predetermined section of the recorded image designated by a user; generating metadata which represents a personal information protection processing result; and generating a personal information protection processed image file including a playing program which plays the original image, the original image file, and the metadata which represents the personal information protection processing result for the original image.

The metadata may be generated for one or more image frames, and may include position information and masking method information of the original image, metadata security information for determining whether the metadata is modulated, and masking region information.

The metadata may further include type information which designates types of an object to be masked and additional descriptive information for personal information protection.

The metadata may have a binary data format, and a metadata security information region in which a fingerprint value generated by using binary data other than the metadata security information of the information included in the metadata is set.

When the metadata is generated for a plurality of image frames, the masking region information may include a plurality of masking region information for each image frame.

The method of the present invention may further include: authenticating whether the user is an authorized user having an authority to extract the recorded image.

The personal information protection processing based on the user input signal may include: displaying the original image by listing a plurality of image frames included in the predetermined section of the recorded image; providing a user interface for setting the masking method and the masking region for performing the personal information protection processing on the image frame selected depending on the user input signal; and performing the personal information protection processing depending on a user input to the user interface.

The method of the present invention may further include: when a preprocessed-image file which includes the playing program which plays the original image and the original image are generated in advance, determining whether the playing program included in the preprocessed-image file plays the metadata; and updating the playing program so as to play the metadata by the playing program, if it is determined that the playing program does not play the metadata.

The image file may further include metadata section information, and the method may further include: when the metadata section information includes metadata section additional information, metadata section position information, metadata section security information, and security information of the metadata section information, determining whether a metadata storage condition agrees with respective information included in the metadata section information; and stopping the playing of the original file by the playing program, if it is determined that the metadata storage condition does not agree with the respective information included in the metadata section information.

An apparatus for protecting personal information of a recorded image according to another aspect of the present invention, includes: a processor configured to perform personal information protection processing by masking a personal information protection region that needs personal information protection based on a user input signal for an original image in a predetermined section of the recorded image designated by a user, generate metadata which represents a personal information protection processing result, and generate a personal information protection processed image file including a playing program which plays the original image, the original image file, and the metadata which represents the personal information protection processing result for the original image.

A computer-readable recording medium having a computer program which is recorded therein and has computer-readable program cord configured to perform a method for protecting personal information of a recorded image, according to another aspect of the present invention, the method for protecting personal information including: performing personal information protection processing by masking a personal information protection region that needs personal information protection based on a user input signal for an original image in a predetermined section of the recorded image designated by a user; generating metadata which represents a personal information protection processing result; and generating a personal information protection processed image file including a playing program which plays the original image, the original image file, and the metadata which represents the personal information protection processing result for the original image.

According to present invention, it is possible to provide an apparatus which is capable of easily performing the personal information protection processing without changing the original image recorded in the image recorder, a method thereof, and a computer-readable recording medium having computer program recorded therein.

In addition, according to the present invention, it is possible to perform the personal information protection processing by installing the personal information protection processing program of the present invention also in the image recorder that does not support the personal information protection processing, thereby easily carrying out the personal information protection processing for the existing recorded image.

Further, according to the present invention, it is possible to perform the personal information protection processing without a change in the original image, such that an authorized user having an authority to process the protection of personal information may additionally and repeatedly perform the personal information protection processing on the original image as necessary.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram illustrating a configuration of a personal information protection processing system for a recorded image according to an embodiment of the present invention;

FIG. 2 is a view illustrating a structure of an image file generated from a personal information protection processing apparatus for the recorded image according to the embodiment of the present invention;

FIG. 3 is a view illustrating an example of the structure of metadata of the image file generated from the personal information protection processing apparatus for the recorded image according to the embodiment of the present invention;

DETAILED DESCRIPTION OF THE INVENTION

Figure 4:
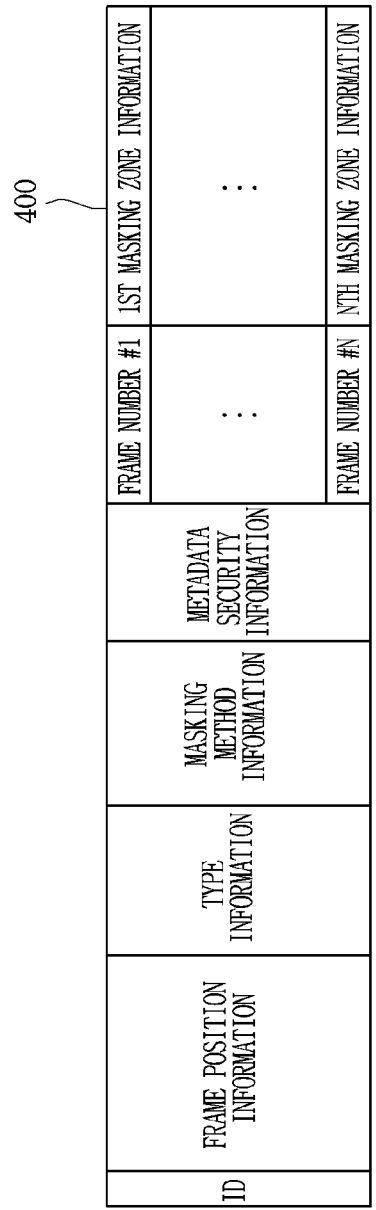
FIG. 4 is a view illustrating another example of the structure of the metadata of the image file generated from the personal information protection processing apparatus for the recorded image according to the embodiment of the present invention.

Hereinafter, preferable embodiments of the present invention will be described with reference to the accompanying drawings. Referring to the drawings, wherein like reference characters designate like or corresponding parts throughout the several views. In the embodiments of the present invention, a detailed description of publicly known functions and configurations that are judged to be able to make the purport of the present invention unnecessarily obscure will be omitted. Further, wordings to be described below are defined in consideration of the functions of the present invention, and may differ depending on the intentions of a user or an operator or custom. Accordingly, such wordings should be defined on the basis of the contents of the overall specification.

FIG. 1 is a block diagram illustrating a configuration of a personal information protection processing system for a recorded image according to an embodiment of the present invention.

A personal information protection processing system 100 includes a camera 110 and a personal information protection processing apparatus 120 for the recorded image. Hereinafter, the personal information protection processing apparatus 120 for the recorded image is briefly referred to as a personal information protection processing apparatus 120.

The camera 110 and the personal information protection processing apparatus 120 may be provided so as to communicate with each other through a wire or wireless network. The camera 110 may be configured as a camera in various shapes such as a CCTV camera, a wireless camera, or the like. The camera 110 may be configured so as to record not only images but also voices if necessary, and may transmit information such as image or audio data generation time to the personal information protection processing apparatus 120 together with camera identification information.

The personal information protection processing apparatus 120 is an image recording and playing apparatus, and may be a network video recorder (NVR). In FIG. 1, one camera 110 is illustrated, but the personal information protection processing apparatus 120 may receive images from another plurality of cameras (not illustrated) other than the illustrated camera 110, and may store and manage images recorded by each camera.

The personal information protection processing apparatus 120 may execute a playing program which plays the recorded image and a personal information protection processing program for performing the personal information protection processing for the recorded image according to the embodiment of the present invention. Herein, if personal information is made public, various types of information including not only face information and car number plate information which may cause a breach of privacy but also information that needs privacy protection such as a restricted location may be exposed.

The personal information protection processing program may perform the personal information protection processing by masking a personal information protection region that needs personal information protection based on a user input signal for an original image in a predetermined section designated by a user of a personal information recorded-image. Herein, the original image may include one or more image frames. In the present disclosure, the masking refers to various personal information protection processing methods for processing a portion of the image such that it is not possible to identify the portion for which personal information protection processing should be performed by using encryption, mosaicing, scrambling, a blur filter, or the like. In this way, the personal information protection processing region may be indicated dark or shown as a blurred region according to the masking method.

Further, the personal information protection processing program may generate metadata which represents a personal information protection processing result, and a personal information protection processed-image file which includes the playing program for the original image, the original image, and the metadata which represents the personal information protection processing result for the original image.

Further, the personal information protection processing program may perform the personal information protection processing by using various types of image analysis and recognition algorithms for face recognition, car number plate recognition, or the like, and automatically generate the metadata which represents the personal information protection processing result.

The playing program may operate so as to determine whether the recorded image is modulated, and may operate so as to determine whether the metadata generated as a result of personal information protection processing is modulated later on. Whether one or more data in the recorded image and metadata are modulated may be used as data for determining whether the corresponding image file may be used as a legal evidential material.

Referring to FIG. 1, the personal information protection processing apparatus 120 may include a processor 210, a communication unit 220, a storage unit 230, a user input unit 240 and a display 250.

The processor 210 controls overall operations of the personal information protection processing apparatus 120, and executes the playing program and the personal information protection processing program according to the embodiment of the present invention.

The communication unit 220 receives the image captured from the camera 110. The communication unit 220 may transmit an image file on which personal information protection processing is performed to an external playing apparatus or a recording medium according to the embodiment of the present invention. The storage unit 230 stores and manages the image received from the camera 110 by the processor 210.

The user input unit 240 receives and processes the user input signal. The user input unit 240 may include various user input devices such as a touch pad, a key pad, a mouse, or the like. The display 250 displays an images processed by the processor 210.

The user input unit 240 and the display 250 may be used by being mounted externally without being included in the personal information protection processing apparatus 120.

The processor 210 performs the personal information protection processing by masking the personal information protection region that needs personal information protection based on the user input signal for the original image in the predetermined section designated by the user of the personal information recorded-image, and generates the metadata which represents the personal information protection processing result. The processor 210 may generate the personal information protection processed-image file which includes the playing program for the original image, the original image, and the metadata which represents the personal information protection processing result for the original image.

The processor 210 may generate a preprocessed-image file which includes the playing program for the original image and the original image, before generating the metadata, and then, when receiving a user input signal requesting the personal information protection processing for the original image, performs the personal information protection processing based on the user input signal, and generates the personal information protection processed-image file which includes the playing program for the original image, the original image, and the metadata which represents the personal information protection processing result for the original image.

The processor 210 executes the playing program included in the personal information protection processed-image file, and the playing program may play the personal information protection processed-image with reference to the metadata included in the image file. The personal information protection processed-image file may be played by using the playing program included in the personal information protection processed-image file in the personal information protection processing apparatus 120, as well as the case in which the personal information protection processed-image file is moved from the personal information protection processing apparatus 120 to another image playing apparatus, without the need to install a separate playing program.

The processor 210 may control the display 250 so as to display the original image by listing a plurality of image frames included in the predetermined section of the recorded image, provide a user interface for setting a masking method for the personal information protection processing of the image frame selected depending on the user input signal, and a masking region to be processed for personal information protection, and perform the personal information protection processing depending on a user input to the user interface.

Meanwhile, when the processor 210 has already generated and stored the preprocessed-image file which includes the playing program for the original image and the original image, there may be a case in which the playing program included in the preprocessed-image file does not support the playing of metadata according to the embodiment of the present invention. In this case, the processor 210 determines whether the playing program included in the preprocessed-image file can play the metadata, and when it is determined that the playing program cannot play the metadata, an operation of generating metadata after updating the playing program may be performed, so that the playing program may play the metadata. For this, the personal information protection processing program may determine whether the playing program included in the preprocessed-image file can play the metadata by analyzing binary codes of the playing program.

By such a method, according to the embodiment of the present invention, it is possible to perform the personal information protection processing for an image or a preprocessed-image file on which the personal information protection processing is not performed as it was generated before implementing personal information protection policy, so as not to change the original file.

FIG. 2 is a view illustrating a structure of the image file generated from the personal information protection processing apparatus 120 according to the embodiment of the present invention.

An image file 10 includes the playing program for the original image, recording data and metadata for personal information protection.

The playing program is a player for playing the recording data and an executable binary data section. The playing program may play the original image together with the metadata generated according to the embodiment of the present invention, so that a portion that needs the personal information protection by processing the personal information protection may be protected by masking the portion.

The recording data may include data recorded in the image frame section requested by the user and the information for managing the recorded data, as well as file storage information (or video clip storage information), video and audio data, text data, and image security information.

The file storage information is additional information relating to the image file 10. Specifically, the file storage information may be the additional information relating to the recorded data, and include information such as recording time, recording place and camera position, information transmitted from the camera 110, information for managing files, metadata section information which is stored information relating to the metadata, security information of file storage information, or the like. When setting a section in which the metadata is included in the image file 10 to the metadata section, in order to determine whether forgery has occurred on the metadata section, the metadata section information, which will be described below with reference to FIG. 7, may be used. The security information of the file storage information is information for determining whether the forgery has occurred on the whole of file storage information, and may be generated by a method of checksum, for example.

The video data is image data captured and transmitted from the camera 110. When audio data generated from a recording device (not illustrated) which is operated together with the camera 110 is included in the recording data, the recording data may further include the video data.

Further, when receiving the text data from the camera 110, the recording data may further include the text data. The above-described original image may correspond to the video data in the recording data. The image security information is information for determining whether contents of recording data is forged during a transfer process, and may be a value generated by the method of checksum, for example.

If the metadata is generated by performing the personal information protection processing according to the embodiment of the present invention, the content and data structure of the recording data may be changed by the addition of the metadata section information to the recording data of the image file 10. Thus, when forgery occurs on the playing program itself such as the playing program being replaced with an old version execution binary, it is possible to use the changed content and data structure of the recording data, such that playing of the video and audio data stored in the recording data may be prevented.

The metadata is generated for one or more image frames, and includes position information and masking method information of the original image, the metadata security information for determining whether the metadata is modulated, and masking region information. The structure of the metadata will be described in detail with reference to FIGS. 3 and 4.

FIG. 3 is a view illustrating an example of the metadata structure of the image file generated from the personal information protection processing apparatus according to the embodiment of the present invention.

Metadata 300 may be generated for one or more image frames. The metadata may include metadata identification information (ID), the position information, type information and masking method information of the original image, the metadata security information for determining whether the metadata is modulated, and the masking region information. The metadata 300 may be classified into a payload region of the metadata 300 for the masking region information and a header region which is the remaining region.

The position information of the image frame may be information representing an image frame section extracted for personal information protection processing, a start position or a start time of the image frame section, a time section, or the like.

The masking method information is information representing an algorithm or a method used in the personal information protection processing. For example, when a blur filter is applied as the masking method, the blur filter may be set in the masking method information.

The masking region information is information representing a blob or a region in which the personal information protection processing is performed, and for example, it may be represented as coordinate information in the image frame.

Optionally, the metadata 300 may further include type information for designating types of an object to be masked. For example, the type information may be information representing whether the object of the personal information to be protected is a face, a car number plate, or a personal information protection area.

Further, the metadata 300 may further include additional descriptive information (not illustrated) which includes an additional explanation or a memo.

The metadata 300 may have an unprintable binary data format. The metadata security information may be generated in the metadata 300 by using binary data of fields other than the metadata security information, that is, binary data added by the personal information protection processing program according to the embodiment of the present invention. For this, the processor 210 in FIG. 1 may generate a fingerprint value by using the binary data added by the personal information protection processing program and set it in the metadata security information region.

In the present disclosure, the fingerprint means, as is known in the art, data representing with data having a fixed length for any input data, and is used to determine whether the input data is modulated. Thus, for the fingerprint used to determine whether input data is modulated may use a hash function which is an easy means of encryption, but it is not limited thereto. Various types of encryption algorithms may be applied to the fingerprint.

FIG. 4 is a view illustrating another example of the metadata structure of the image file generated from the personal information protection processing apparatus according to the embodiment of the present invention.

When metadata is generated for a plurality of image frames, metadata 400 may also be generated, as illustrated in FIG. 4.

Masking region information may include a plurality of masking region information for each image frame. For example, as illustrated in FIG. 4, the masking region information may include masking region information (the 1st masking region information to the nth masking region information) for each frame number (frame number #1 to frame number #n) of the plurality of image frames, which is the original image.

Further, when setting a plurality of regions in which the personal information protection processing is performed, metadata in the form of the metadata 400 for the corresponding plurality of image frames may be generated by as many as the number of regions in which the personal information protection processing is performed. For example, when the masking region is four face portions in the image frame, four metadata 400 may be generated for the corresponding plurality of image frames. At this time, the masking method for the four face portions may be set differently from each other.

Figure 5:
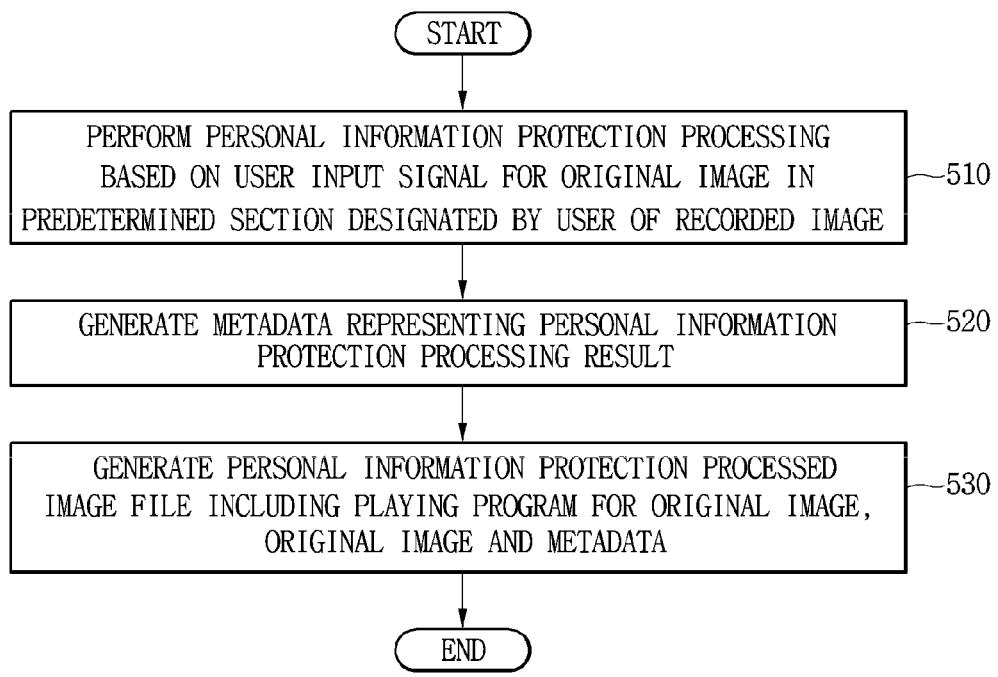
FIG. 5 is a flow chart illustrating a personal information protection processing method for the recorded image according an embodiment of the present invention.

FIG. 5 is a flow chart illustrating the personal information protection processing method for the recorded image according to the embodiment of the present invention.

The personal information protection processing apparatus 120 performs the personal information protection processing by masking the personal information protection region that needs personal information protection based on the user input signal for the original image in the predetermined section designated by the user of the recorded-image (510).

The personal information protection processing apparatus 120 generates metadata which represents the personal information protection processing result (520). The personal information protection processing apparatus 120 may simultaneously perform operations of steps 510 and 520 in FIG. 5 so as to generate metadata while performing personal information protection processing, and may generate and store final metadata upon receiving the user input signal for storing the final result of personal information protection processing, as a user input for personal information protection processing is completed.

The personal information protection processing apparatus 120 generates the personal information protection processed-image file which includes the playing program for the original image, the original image, and the metadata which represents the personal information protection processing result for the original image (530).

Meanwhile, when the personal information protection processing apparatus 120 has already generated and stored the preprocessed-image file which includes the playing program for the original image and the original image, there may be the case in which the playing program included in the preprocessed-image file does not support the playing of metadata according to the embodiment of the present invention. In preparation for this case, the personal information protection processing apparatus 120 may determine whether the playing program included in the preprocessed-image file can play the metadata.

When it is determined that the playing program can play the metadata, the personal information protection processing apparatus 120 may perform the operation of step 520 in FIG. 5 for generating metadata or the operation of step 530 in FIG. 5 for generating an image file. When it is determined that the playing program cannot play the metadata, the personal information protection processing apparatus 120 may perform the operation of step 520 in FIG. 5 for generating metadata or the operation of step 530 in FIG. 5 for generating an image file after updating the playing program so that the playing program can play the metadata.

Figure 6:
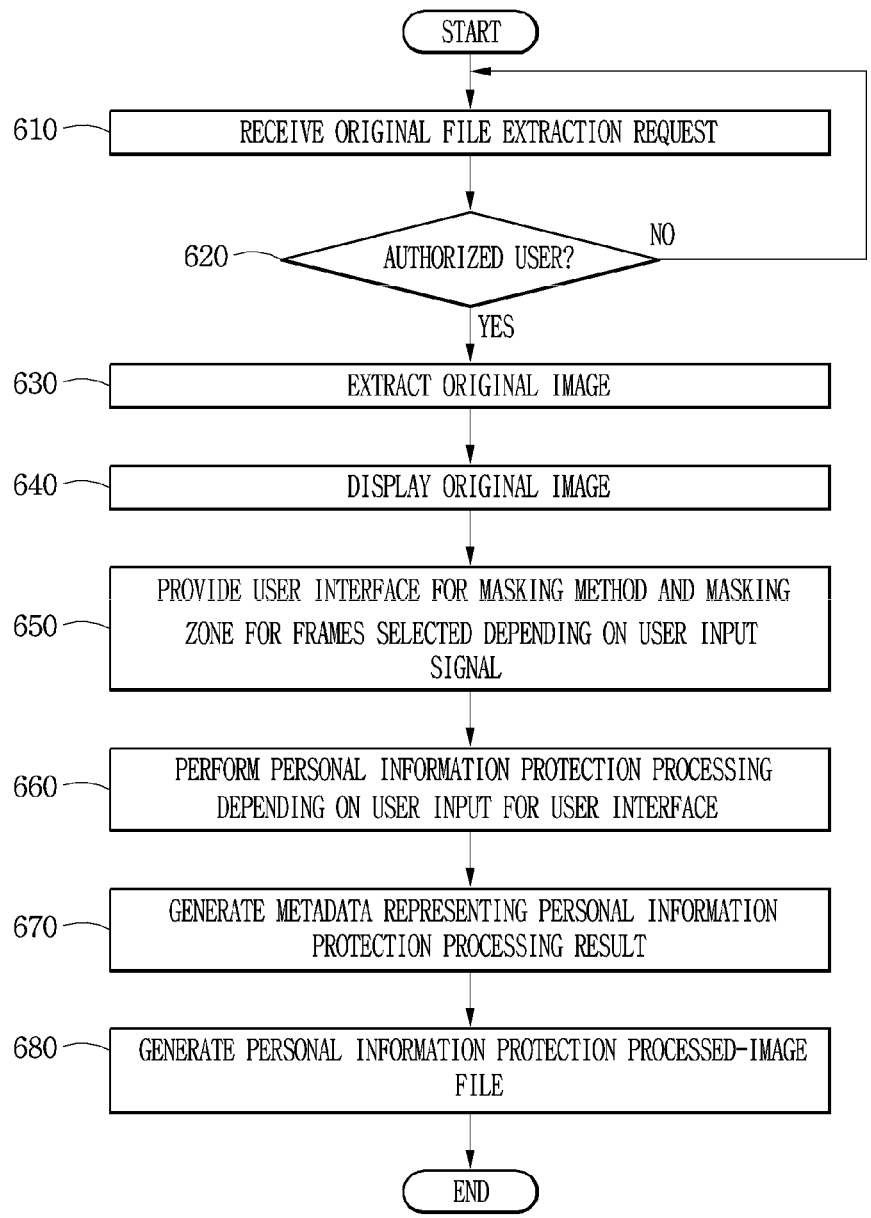
FIG. 6 is a flow chart illustrating in detail the personal information protection processing method for the recorded image according to the embodiment of the present invention.

FIG. 6 is a flow chart illustrating in detail the personal information protection processing method for the recorded image according to the embodiment of the present invention.

The personal information protection processing apparatus 120 receives a user input signal requesting extraction of the original image in the predetermined section designated by the user of the recorded image (610).

The personal information protection processing apparatus 120 determines whether the user who requested extraction of the original image is an authorized user having an authority to perform the personal information protection processing for the original image (620). For example, in order to determine whether the user is the authorized user, the personal information protection processing apparatus 120 requests input of the password previously applied to the authorized user, and if the input password agrees with the registered password, the corresponding user may be determined as the authorized user.

The personal information protection processing apparatus 120 extracts the original image requested by the authorized user (630), and displays the extracted original image on the display (640). At this time, the personal information protection processing apparatus 120 may display the original image by listing frame by frame, so that the user may easily select the image frame for performing the personal information protection processing on the extracted original image.

The personal information protection processing apparatus 120 provides the user interface for setting the masking method and the masking region for performing the personal information protection processing on the image frame selected depending on the user input signal (650). For example, if the user sets the masking region by using the user input device for the image frame selected by the user, the personal information protection processing apparatus 120 provides a list illustrating the masking methods applicable to the set masking region, so that the user may select a desired masking method from the list.

The personal information protection processing apparatus 120 receives the user input for setting the masking region and the masking method for the selected image frames for the user interface, and performs the personal information protection processing depending on the received user input (660).

For example, when the user selects the masking region and the masking method for a specific image frame, the same masking method for the same masking region is set for a predetermined number of subsequent image frames from the corresponding image frames so as to perform the personal information protection processing. Such a method may be used if a position change in the masking region is not so great within the corresponding number of image frames. Alternately, the personal information protection processing apparatus 120 may use various methods for detecting and recognizing the masking regions selected by the user, thereby it is possible to perform the personal information protection processing by additionally using a method of tracing the masking region on image frames after the selected image frames, for example. Further, the personal information protection processing apparatus 120 displays the image by reflecting the personal information protection processing result depending on the user input to the selected image frames, so that the user may immediately confirm the selected personal information protection processing result and correct or edit as necessary.

The personal information protection processing apparatus 120 generates metadata which represents the personal information protection processing result (670). The metadata may be generated in a form as described with reference to FIGS. 3 and 4.

The personal information protection processing apparatus 120 generates the personal information protection processed-image file which includes the playing program for the original image, the original image, and the metadata which represents the personal information protection processing result for the original image (680).

Meanwhile, in order to determine whether forgery has occurred on the metadata section data when the playing program plays the original image by using the metadata, the personal information protection processing apparatus 120 may use the metadata section information included in the file storage information of FIG. 2. In detail, the personal information protection processing apparatus 120 may stop the playing of the original file based on determining whether the metadata agrees with actual metadata. For example, if it is determined that the metadata section information of FIG. 2 is does not agree with the actual metadata, the playing of the original file is stop.

Figure 7:
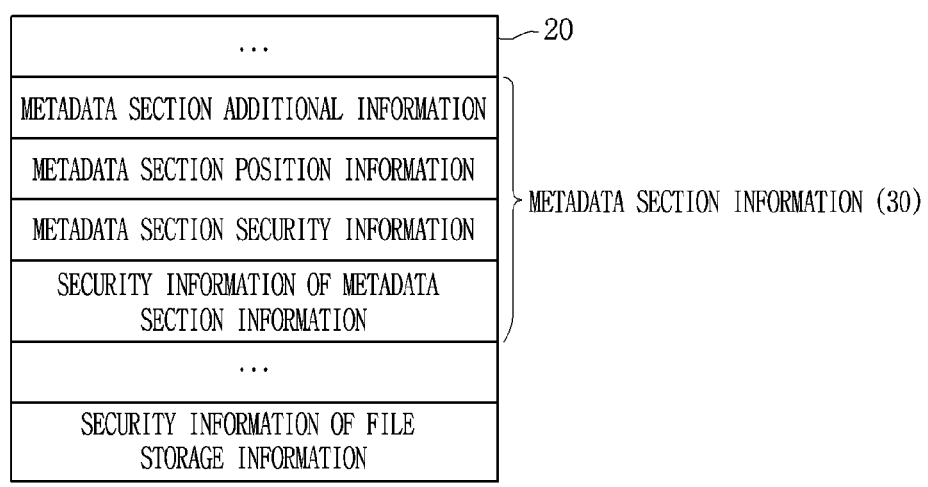
FIG. 7 is a view illustrating an example of the configuration of metadata section information included in file storage information of FIG. 2.

FIG. 7 is a view illustrating an example of the configuration of metadata section information included in the file storage information of FIG. 2.

According to the embodiment of the present invention, metadata section information 30 is included in the file storage information 20, as illustrated in FIG. 7.

The metadata section information 30 may include metadata section additional information, metadata section position information, metadata section security information and the security information of metadata section information.

The metadata section additional information may include metadata generation time, metadata revision time, and user information at the time of metadata generation or revision.

The metadata section position information is information representing the position at which the metadata is included in the image file 10, for example, the information representing the metadata start position and metadata final position.

The metadata section security information is information for determining whether the whole of the metadata section including the metadata security information of FIG. 3 and FIG. 4 is forged, and may be generated by a method of message-digest algorithm 5 (MD5) checksum, for example. The metadata section security information is information for determining whether the whole of the metadata section is forged, and is distinguished from the metadata security information for determining whether the data inside the metadata is forged.

The security information of the metadata section is information for determining whether the metadata section information 30 is forged, and may be generated by the method of checksum, for example.

The processor 210 of FIG. 1 determines whether the metadata storage condition agrees with the respective information included in the metadata section information according to the execution of the personal information protection processing program, and if the metadata storage condition does not agree with the information included in metadata section information, it may stop the playing of the original file by playing program. For example, when the metadata section is removed arbitrarily or when the data included in the metadata section is removed or modulated, the processor 210 may not reliably obtain the respective information included in the metadata section information 30 from the metadata, thereby it is possible to determine that forgery has occurred on the data included in the metadata section.

In addition, the personal information protection processing method and program according to the embodiment of the present invention may further include the metadata section information, and may be performed by further including the steps of: when the metadata section information includes the metadata section additional information, the metadata section position information, and the security information of metadata section information, determining whether the metadata storage condition agrees with the respective information included in the metadata section information; and if it is determined that the metadata storage condition does not agree with the respective information included in the metadata section information, stopping the playing of the original file by the playing program.

One aspect of the present invention may be implemented as a computer-readable code on a computer-readable recording medium. The codes and code segments for implementing the above-described program may be easily deduced by computer programmers in the related art. The computer-readable recording media include all types of the recording devices in which data readable by the computer system are stored. Examples of computer-readable recording media may include ROM, RAM, CD-ROM, magnetic tapes, floppy disks, optical disks, or the like. In addition, the computer-readable media are dispersed in a computer system connected through a network, and may be stored and executed in the computer-readable codes by a dispersion method.

While the present invention has been described with reference to the preferred embodiments, it will be understood by those skilled in the related art that various modifications and variations may be made therein without departing from the scope of the present invention as defined by the appended claims.

What is claimed is:

1. A method for protecting personal information of a recorded image, comprising:
    performing personal information protection processing by masking a personal information protection region that needs personal information protection based on a user input signal for an original image in a predetermined section of the recorded image designated by a user;
    generating metadata which represents a personal information protection processing result; and
    generating a personal information protection processed image file including a playing program which plays the original image, the original image file, and the metadata which represents the personal information protection processing result for the original image;
    wherein the metadata is generated for one or more image frames, and includes position information and masking method information of the original image, metadata security information for determining whether the metadata is modulated, and masking region information.

2. The method according to claim 1, wherein the metadata further comprises type information which designates types of an object to be masked and additional descriptive information for personal information protection.

3. The method according to claim 1, wherein the metadata has a binary data format, and a metadata security information region in which a fingerprint value generated by using binary data other than the metadata security information of the information included in the metadata is set.

4. The method according to claim 1, wherein, when the metadata is generated for a plurality of image frames, the masking region information includes a plurality of masking region information for each image frame.

5. The method according to claim 1, further comprising: authenticating whether the user is an authorized user having an authority to extract the recorded image.

6. The method according to claim 1, wherein the personal information protection processing step based on the user input signal comprises:
    displaying the original image by listing a plurality of image frames included in the predetermined section of the recorded image;
    providing a user interface for setting the masking method and the masking region for performing the personal information protection processing on the image frame selected depending on the user input signal; and performing the personal information protection processing depending on a user input to the user interface.

7. The method according to claim 1, further comprising:
when a preprocessed-image file which includes the playing program which plays the original image and the original image are generated in advance,
determining whether the playing program included in the preprocessed-image file plays the metadata; and
updating the playing program so as to play the metadata by the playing program, if it is determined that the playing program does not play the metadata.

8. The method according to claim 1, wherein the image file further comprises metadata section information, and the method further comprises:
when the metadata section information includes metadata section additional information, metadata section position information, metadata section security information, and
security information of the metadata section information, determining whether a metadata storage condition agrees with respective information included in the metadata section information; and
stopping the playing of the original file by the playing program, if it is determined that the metadata storage condition does not agree with the respective information included in the metadata section information.

9. An apparatus for protecting personal information of a recorded image, comprising:
a processor configured to perform personal information protection processing by masking a personal information protection region that needs personal information protection based on a user input signal for an original image in a predetermined section of the recorded image designated by a user,
generate metadata which represents a personal information protection processing result, and
generate a personal information protection processed image file including a playing program which plays the original image, the original image file, and the metadata which represents the personal information protection processing result for the original image;
wherein the metadata is generated for one or more image frames, and includes position information and masking method information of the original image, metadata security information for determining whether the metadata is modulated, and masking region information.

10. The apparatus according to claim 9, further comprising:
a display which displays an image processed by the processor; and
a user input unit which receives and processes the user input signal,
wherein the processor is configured to control the display so as to display the original image by listing a plurality of image frames included in the predetermined section of the original image, provide a user interface for setting a masking method and a masking region for the image frames selected depending on the user input signal, and perform the personal information protection processing depending on the user input to the user interface.

11. The apparatus according to claim 9, wherein the processor is configured to, when a preprocessed-image file which includes the playing program which plays the original image and the original image are generated in advance, determine whether the playing program included in the preprocessed-image file plays the metadata, and updating the playing program so as to play the metadata by the playing program, if it is determined that the playing program does not play the metadata.

12. The apparatus according to claim 9, wherein the image file further comprises metadata section information, and
when the metadata section information includes metadata section additional information, metadata section position information, metadata section security information, and security information of the metadata section information,
the processor is configured to determine whether a metadata storage condition agrees with respective information included in the metadata section information, and stop the playing of the original file by the playing program, if it is determined that the metadata storage condition does not agree with the respective information included in the metadata section information.

13. A non-transitory computer-readable recording medium having a computer program which is recorded therein and has computer-readable program cord configured to perform a method for protecting personal information of a recorded image, the method for protecting personal information comprising:
performing personal information protection processing by masking a personal information protection region that needs personal information protection based on a user input signal for an original image in a predetermined section of the recorded image designated by a user;
generating metadata which represents a personal information protection processing result; and
generating a personal information protection processed image file including a playing program which plays the original image, the original image file, and the metadata which represents the personal information protection processing result for the original image;
wherein the metadata is generated for one or more image frames, and includes position information and masking method information of the original image, metadata security information for determining whether the metadata is modulated, and masking region information.

* * * * *